US007925613B2

(12) United States Patent
Fujimoto et al.

(10) Patent No.: US 7,925,613 B2
(45) Date of Patent: Apr. 12, 2011

(54) ACTION EFFICIENCY SUPPORT APPARATUS AND METHOD

(75) Inventors: Masakazu Fujimoto, Kanagawa (JP); Manabu Ueda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 847 days.

(21) Appl. No.: 11/729,902

(22) Filed: Mar. 30, 2007

(65) Prior Publication Data

US 2008/0071719 A1 Mar. 20, 2008

(30) Foreign Application Priority Data

Sep. 15, 2006 (JP) ................................ P2006-250667

(51) Int. Cl.
 G06F 15/00 (2006.01)
 G06F 15/18 (2006.01)
(52) U.S. Cl. ........................................................ 706/62
(58) Field of Classification Search .................... 706/46, 706/62
 See application file for complete search history.

(56) References Cited

U.S. PATENT DOCUMENTS

| 7,170,993 | B2 * | 1/2007 | Anderson et al. ........ 379/265.09 |
| 7,405,653 | B2 * | 7/2008 | Tice et al. ................. 340/539.12 |
| 7,472,099 | B2 * | 12/2008 | Nishiuma et al. ............... 706/45 |
| 7,536,417 | B2 * | 5/2009 | Walsh et al. ................ 707/104.1 |
| 7,589,637 | B2 * | 9/2009 | Bischoff et al. ............. 340/573.1 |
| 2004/0083389 | A1 * | 4/2004 | Yoshida ........................ 713/201 |
| 2004/0095467 | A1 * | 5/2004 | Koizumi ........................ 348/169 |
| 2004/0204775 | A1 * | 10/2004 | Keyes et al. ..................... 700/29 |
| 2004/0204975 | A1 * | 10/2004 | Witting .............................. 705/7 |
| 2005/0177402 | A1 * | 8/2005 | Walker et al. ...................... 705/5 |
| 2006/0055543 | A1 * | 3/2006 | Ganesh et al. ............. 340/573.1 |
| 2006/0184421 | A1 * | 8/2006 | Lipsky et al. ................... 705/14 |
| 2007/0150460 | A1 * | 6/2007 | Evans ................................ 707/4 |
| 2007/0233631 | A1 * | 10/2007 | Kobayashi et al. ............. 706/52 |
| 2007/0271205 | A1 * | 11/2007 | Aravamudan et al. .......... 706/12 |

FOREIGN PATENT DOCUMENTS

| JP | 2004-094593 A | 3/2004 |
| JP | 2004-193991 A | 7/2004 |
| JP | 2005-189981 A | 7/2005 |
| WO | WO 03052662 | * 6/2003 |

OTHER PUBLICATIONS

Kenneth B. Howell, "Priniciples of Fourier Analysis", 2001, Chapman & Hall/CRC, p. 4, ch. 36.*
C. Richard Weylman, "Opening Closed Doors: Keys to Reaching Hard-to-Reach People", 1994, McGraw-Hill, p. 184.*
Mark Burgess, "Two Dimensional Time-Series for Anomaly Detection and Regulation in Adaptive Systems", DSOM 2002, LNCS 2506, pp. 169-180, 2002).*

* cited by examiner

*Primary Examiner* — Donald Sparks
*Assistant Examiner* — Vincent M Gonzales
(74) *Attorney, Agent, or Firm* — Sughrue Mion, PLLC

(57) ABSTRACT

An action efficiency support apparatus includes a detection unit, a storage unit, a calculation unit and a judgment unit. The detection unit detects an activity to acquire activity information. The storage unit stores the activity information. The calculation unit calculates a probability pattern as to presence or absence of the activity in a predetermined period or a probability pattern a frequency of the activity in the predetermined period, based on the activity information. The judgment unit judges an effect of personal action based on the calculated probability pattern.

12 Claims, 11 Drawing Sheets

ENTIRE PROCESS OF EXEMPLARY EMBODIMENT

ENTIRE PROCESS OF EXEMPLARY EMBODIMENT

EXAMPLE OF PROCESS FOR CALCULATING PERIODICAL PROBABILITY

EXAMPLE OF PROBABILITY PATTERN OF AVERAGE
STAY-IN-OFFICE RATIO IN ONE WEEKDAY

EXAMPLE OF PROBABILITY PATTERN OF AVERAGE
STAY-IN-OFFICE RATIO IN ONE WEEK

FIG. 7

| RECEIVER ID | TIME | DETECTED TAG ID |
|---|---|---|
| 1 | 2006/03/16 10:30:00 | 1,2,3,4,5,6 |
| 2 | 2006/03/16 10:30:00 | 7,8,9,10 |
| 3 | 2006/03/16 10:30:00 | 11,12,13,14 |
| 1 | 2006/03/16 10:30:30 | 1,2,3,4,5 |
| 2 | 2006/03/16 10:30:30 | 6,7,8,9,10 |
| 3 | 2006/03/16 10:30:30 | 11,12,13,14 |
| 1 | 2006/03/16 10:31:00 | 1,2,3,4,5 |
| 2 | 2006/03/16 10:31:00 | 6,7,8,9 |
| 3 | 2006/03/16 10:31:00 | 10,11,12,13 |
| 1 | 2006/03/16 10:30:30 | 1,2,3,4,5 |
| : | : | : |

EXAMPLE OF ACTION LOG

CHANGE IN NUMBER OF PERSONS WHO STAY IN OFFICE A DAY

CHANGE IN NUMBER OF PERSONS WHO STAY IN OFFICE OBTAINED FROM ACTION LOG

EXAMPLE OF PEAK PREDICTION IN ONE WEEKDAY

EXAMPLE OF PEAK PREDICTION IN ONE WEEK

ACTIVITY PATTERN OF SALES DEPARTMENT

ACTIVITY PATTERN OF DEVELOPMENT DEPARTMENT

EXAMPLE OF PROCESS FOR JUDGING IMMEDIATE EFFECT

EXAMPLE OF JUDGING IMMEDIATE EFFECT

EFFECT PREDICTION FROM STAY-IN-OFFICE RATIO
AND STAY-IN-CONFERENCE-ROOM RATIO

ACTION EFFICIENCY SUPPORT APPARATUS AND METHOD

CROSS-REFERENCE TO RELATED APPLICATIONS

This application is based on and claims priority under 35 U.S.C. §119 from Japanese Patent Application No. 2006-250667 filed Sep. 15, 2006.

BACKGROUND

Technical Field

This invention relates to optimization of the effect of personal action using a log of persons' activities and in particular to the invention intends to use periodicity of an activity pattern.

SUMMARY

According to an aspect of the invention, an action efficiency support apparatus includes a detection unit, a storage unit, a calculation unit and a judgment unit. The detection unit detects an activity to acquire activity information. The storage unit stores the activity information. The calculation unit calculates a probability pattern as to presence or absence of the activity in a predetermined period or a probability pattern of a frequency of the activity in the predetermined period, based on the activity information. The judgment unit judges an effect of personal action based on the calculated probability pattern of the frequency of occurrence of the activity.

BRIEF DESCRIPTION OF THE DRAWINGS

Exemplary embodiments of the invention will be described below in detail with reference to the accompanying drawings wherein:

FIG. 7 is a drawing to describe an example of an action log used in the exemplary embodiment of the invention;

DETAILED DESCRIPTION

Referring now to the accompanying drawings, exemplary embodiments of the invention will be described below.

When broadcasting to one group (e.g., requesting to fill out a questionnaire through a mailing list or a Web page), the exemplary embodiment outputs a prediction value indicating a timing until which if broadcasting or releasing is conducted, the broadcasting or the releasing is effective, based on the predicted variation of a office attendance ratio or an access ratio to a server obtained from a past action history. The exemplary embodiment may predict a broadcast arrival ratio at each timing (navigation of delivery time setting). To update a Web page, the exemplary embodiment may evaluate a time at which number of persons accessing the Web page is small, as a high effect.

In the case of broadcasting to one group, if the current office attendance ratio is higher than the prediction value or a peak of the near-future prediction values, the exemplary embodiment may notify that a potential effect of currently taking action is high. If the current office attendance ratio is lower than the prediction value, the exemplary embodiment may notify that the expected effect is not produced.

The exemplary embodiment compares between the office attendance probability based on an activity history of one group and a conference room attendance ratio (or any other IT log) and presents a time period where the difference therebetween is large, to thereby navigate so as to avoid a busy time period among other jobs.

The exemplary embodiment will be described below in detail.

Figure 1:
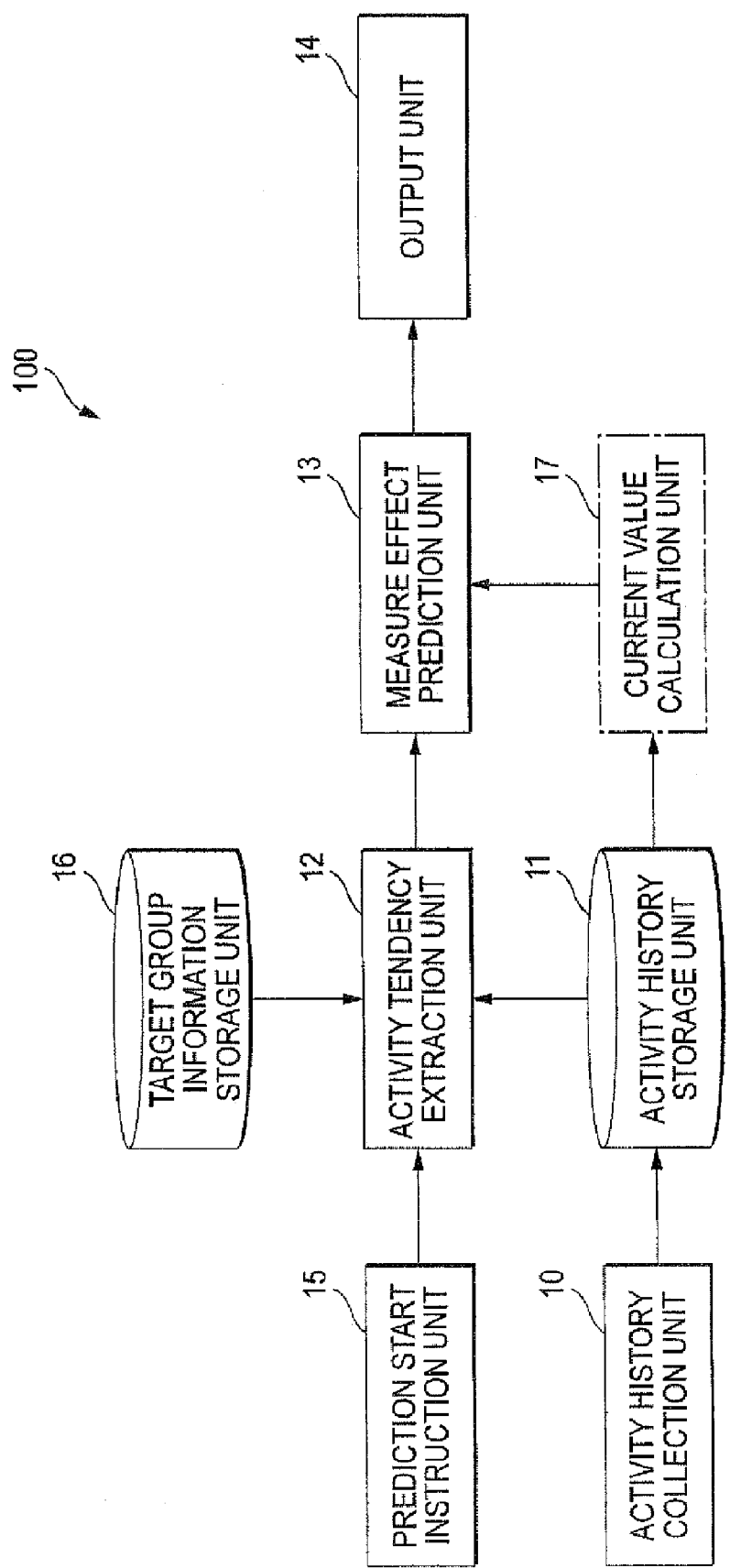
FIG. 1 is a block diagram to show the configuration of an action efficiency support server according to an exemplary embodiment of the invention as a whole.

FIG. 1 shows an action efficiency support server 100 according to the exemplary embodiment of the invention as a whole using functional blocks. In FIG. 1, the action efficiency support server 100 includes an activity history collection unit 10, an activity history storage unit 11, an activity tendency extraction unit 12, a measure effect prediction unit 13, an output unit 14, a prediction start instruction unit 15, a target group information storage unit 16, and a current value calculation unit 17. Each unit is implemented by cooperation between the hardware resources of a server computer and software.

Figure 2:
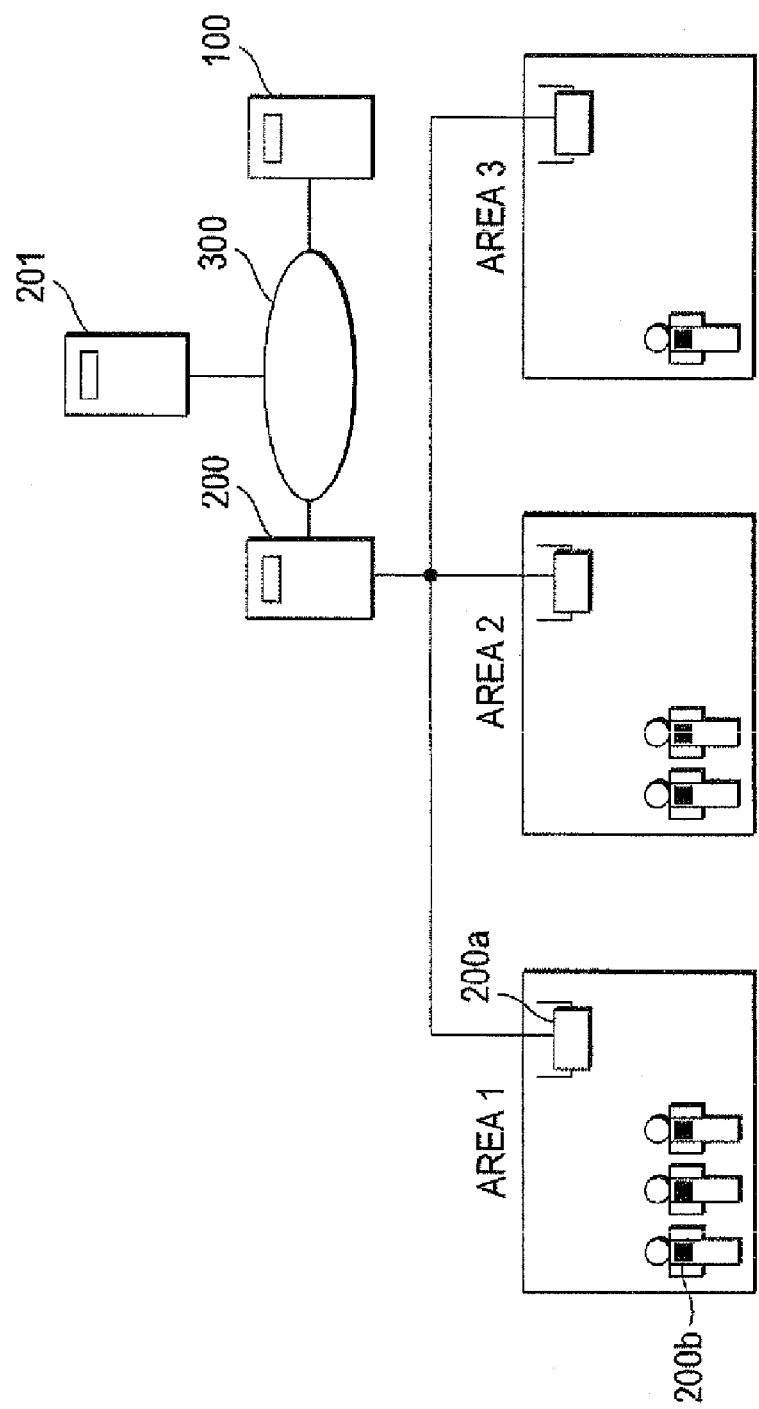
FIG. 2 is a drawing to show environment in which the action efficiency support server according to the exemplary embodiment of the invention is used as a whole.

The activity history collection unit 10 collects a result of person's activity as a log containing time, such as an action history of an action log collection server (person position detection system) 200, a mail log of a mail server 201, or an access log to a file server 202 shown in FIG. 2. The activity history collection unit 10 may use various logs so long as they are recorded by a system.

The activity history storage unit 11 records the collected logs and is implemented as a hard disk or any other record medium for recording the logs in the server 100. Plural activity history storage units 11 may be provided on a network.

The activity tendency extraction unit 12 extracts a temporal change of the activity history of a group as a predicted variation pattern. The measure effect prediction unit 13 predicts the effects produced by measures taken for a target group (for example, activity planning such as the activity start timing and the setting of delivery time contained in a message) based on the predicted variation pattern.

The output unit (which may be a record unit) 14 displays or notifies a prediction result of the effect of the measure via mail, or records the prediction result of the effect of the measure.

The prediction start instruction unit 15 makes a request for starting the prediction on demand. The activity efficiency support server 100 may calculate the prediction value at a predetermined timing without the prediction start instruction unit 15 being provided, so as to always output the effect prediction result after the present time.

The target group information storage unit 16 stores member information of a target group from which the tendency is to be extracted.

The current value calculation unit 17 calculates current enrollment or a current value of the office attendance ratio, for comparison with the prediction value. The current value calculation unit 17 may not be provided if the comparison is not required.

FIG. 2 shows an example configuration for collecting, on a network 300, the action history and/or the mail transmission-reception history of each member having an RFID tag. In FIG. 2, the action efficiency support server 100, an action log collection server 200, and a mail server 201 are connected to the network 300. Any other system for collecting the user's activity logs such as a file server may be connected to the network 300.

The action log collection server 200 is connected to receivers 200a installed in various areas and receives a person's positional information from the receivers 200a. Each area is distinguished from another location as a detection target area by installing a different receiver 200a in each area. The areas typically may be a living room, a conference room or an open space. The receiver 200a detects a position of each member having an RFID tag 200b and generates the person's positional information indicating the time and location of a person's position. The action log collection server 200 handles the person's positional information as an action log.

The action efficiency support server 100 collects activity logs of various types from the action log collection server 200, the mail server 201, and other servers and supports to improve efficiency of an activity.

Figure 3:
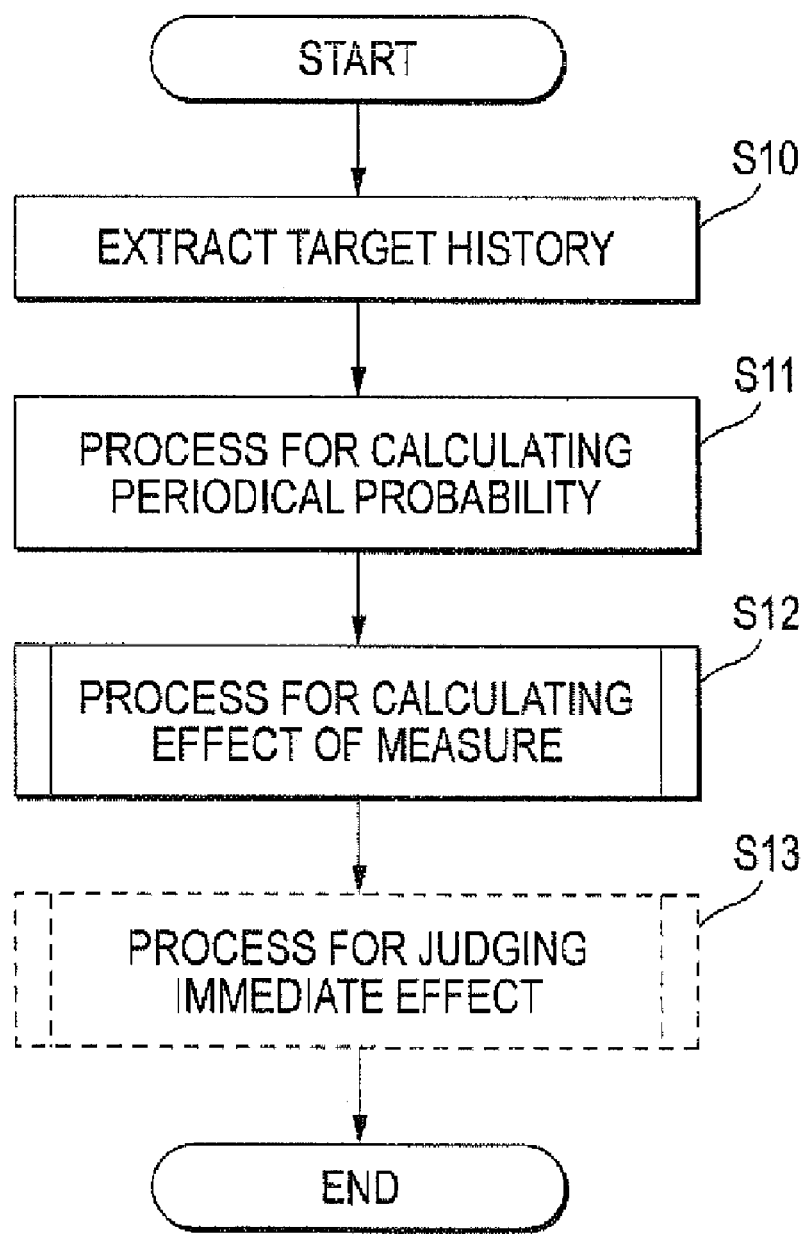
FIG. 3 is a flowchart to show a process according to the exemplary embodiment of the invention as a whole.

FIG. 3 shows a process executed by the action efficiency support server 100 according to the exemplary embodiment as a whole. In FIG. 3, first the activity tendency extraction unit 12 refers to the target group information storage unit 16 to extract a history of the target group from the activity history storage unit 11 (S10). Next, the activity tendency extraction unit 12a calculates a periodic variation pattern from the extracted history (S11). Subsequently, the measure effect prediction unit 13 calculates the effect prediction value for a particular measure (an activity plan such as the activity start timing or the setting of the delivery time of request description) and the output unit 14 outputs or records the result (S12). Optionally, to judge as to whether or not the potential effect at the current time, that is, whether the immediate effect is likely to be high, a process for judging the immediate effect may be performed. If the predicted immediate effect is high, the result is notified (S13). The measure effect prediction unit 13 may perform the process for judging the predicted immediate effect or another unit for performing such a process may be provided. The details of the process for judging the predicted immediate effect will be described later as a second modified example.

To use the office attendance ratio in mail broadcasting, it is judged that a time period where the office attendance ratio is high is the most effective. In the case of using a log in the mail server 201, for example, it is judged that a predetermined time (for example, 30 minutes or one hour) preceding a time when a mail transmission probability is high, is a low-effect time zone as a mail creation time. In the case of using a log in the file server, for example, it is judged that a predetermined time (for example, one hour or two hours) preceding a time when a file storage probability is high is a low-effect time period as a file creation time. For example, it is judged that a predetermined time (for example, 30 minutes or one hour) following a time when the file access probability is high is a low-effect time period as a file content checking time.

The measure effect prediction unit 13 typically uses such knowledge as a rule base and calculates the effect. However, the mode of the measure effect prediction unit 13 is not limited thereto.

Figure 4:
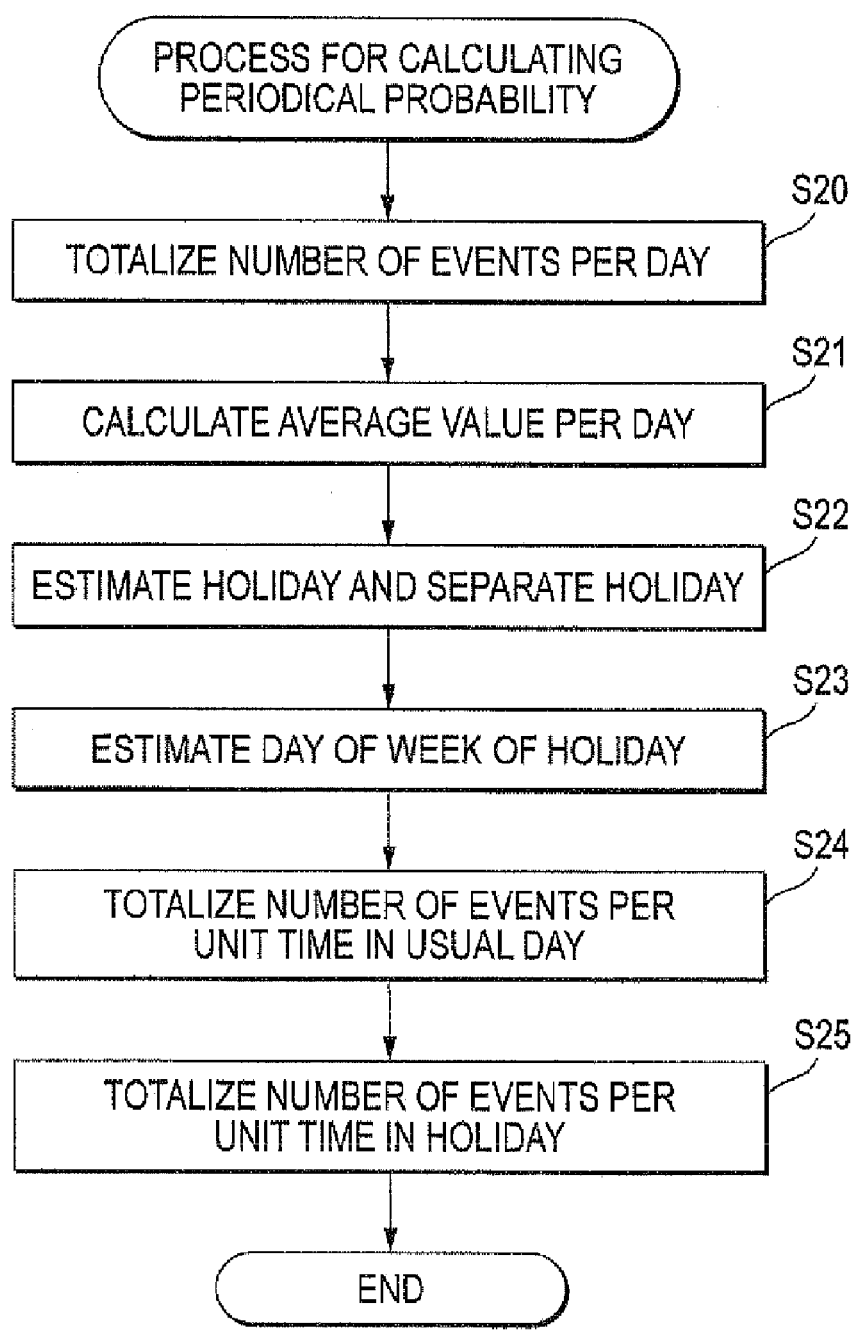
FIG. 4 is a flowchart to describe an example of a process for calculating a periodic probability shown in FIG. 3.

The process for calculating the periodic probability at S11 in FIG. 3 is typically a process for finding a periodic variation on the assumption that the activity is a human's activity as shown in FIG. 4.

In FIG. 4, first, the activity tendency extraction unit 12 totalizes the number of events per day (S20). Next, the activity tendency extraction unit 12 compares the number of events in each day with an average value of the number of events per day and separates a holiday or a no-activity day (which will be hereinafter referred to as "holiday") and a usual day (S21 and S22). Subsequently, the activity tendency extraction unit 12 estimates what day is (what days are) the holiday (S23). The activity tendency extraction unit 12 obtains the probability of the number of holidays for each day of week and assumes that a day of week whose probability is equal to or higher than a judgment value is the holiday. For example, in the case where the office attendance ratio is used, since there is a national holiday and workers may be in the office in holiday, the determination value is not 100% or 0%. For example, when the office attendance ratio is 30% or less, the activity tendency extraction unit 12 assumes that such a day is the day of week of the holidays. The activity tendency extraction unit 12 totalizes the number of events in terms of setup time in each usual day, totalizes the number of events in terms of the setup time in each holiday, and obtains an average value of the office attendance ratio in each time period (S24 and S25).

Here, the periodicity is obtained with usual days and holidays being distinguished from each other. However, the periodicity in days of week, days of month or months of year may be found. A frequency component of change may be extracted by Fourier transform to determine the periodicity.

Figure 5:
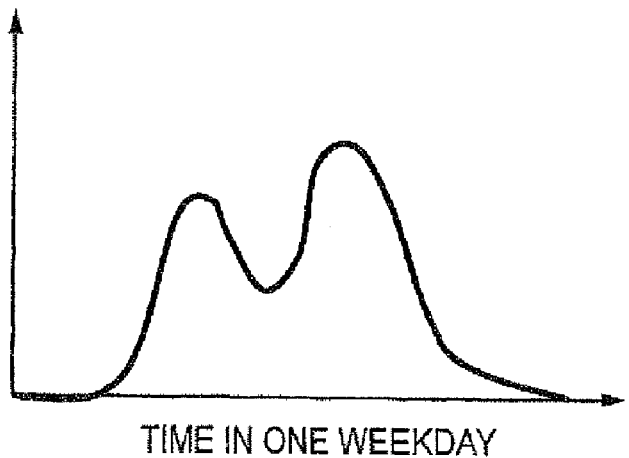
FIG. 5 is a drawing to describe an example of a periodic probability pattern of a frequency of occurrence of an activity with a period being one day.
Figure 6:
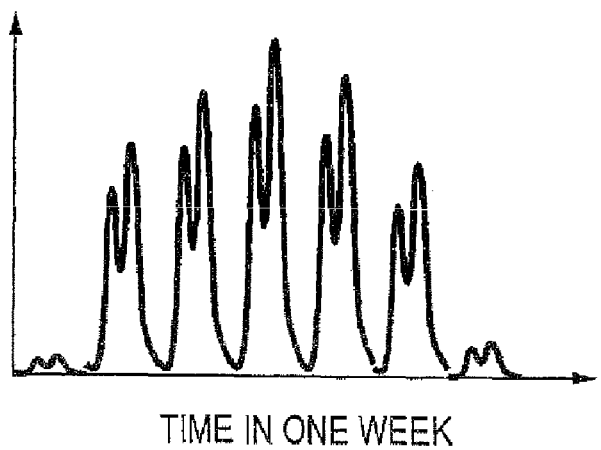
FIG. 6 is a drawing to describe an example of a periodic probability pattern of a frequency of occurrence of an activity with a period being one week.

FIG. 5 shows an example of the variation in the average office attendance ratio in one weekday. FIG. 6 shows an example of the variation in the average office attendance ratio in a week.

Figure 8:
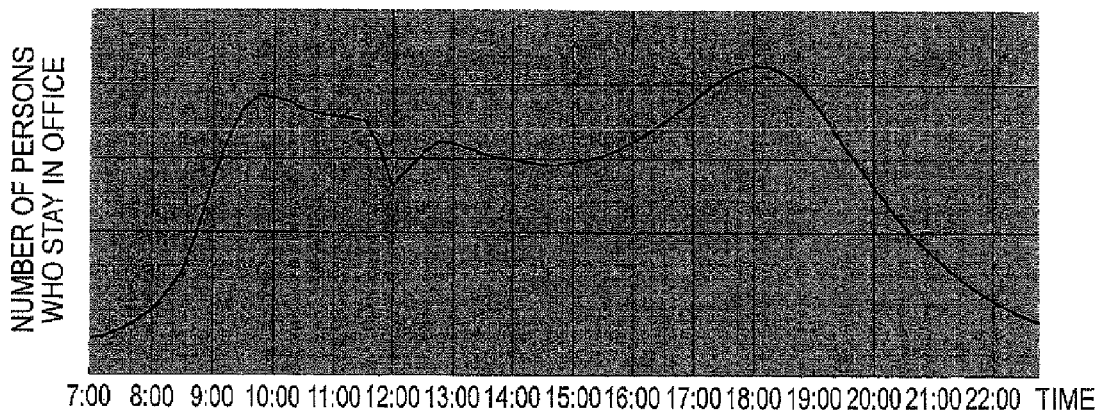
FIG. 8 is a drawing to describe an example of variation in number of persons who are in an office, which is generated based on the action log shown in FIG. 7.

FIG. 7 is a table to show an example of an action log (a person's positional information). Here, an example where three receivers 200a, that is, three areas detect a tag every 30 seconds. However, the invention is not limited thereto. Also, FIG. 8 shows an example where such data is collected and the number of persons in the office at each point in time is totalized. Such data is totalized over plural periods and a periodic probability pattern (office attendance ratio pattern) is generated. If the totalization is not sufficient, an error caused by fluctuation may be mixed, but a probability pattern of a frequency of occurrence of an activity may be generated in such a range. In an extreme case, the actual measured values in one period may be used as an alternative to the probability pattern.

In the case where an event such as the mail transmission time is recorded like a log in the mail server 201, the number of events is counted every unit duration in time, for example, the number of events from 10:00:00 to 10:15:00 and the number of events from 10:15:00 to 10:30:00 are counted with 15 minutes as a unit time. Thereby, a similar statistical amount is obtained.

Figure 9:
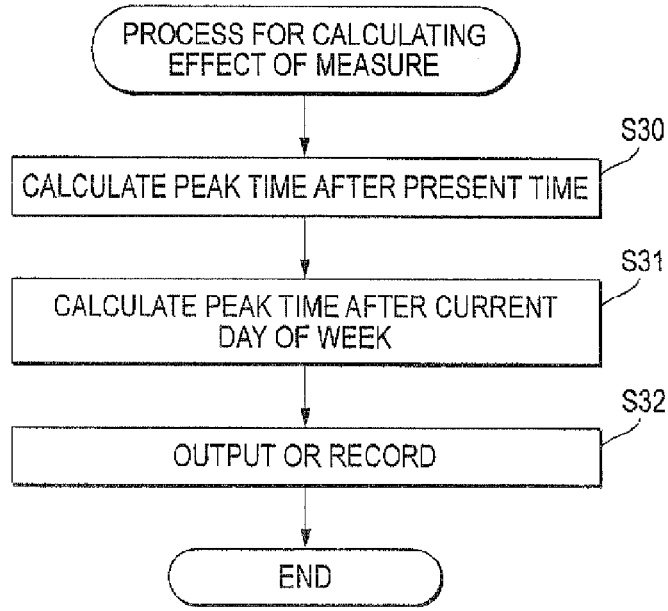
FIG. 9 is a flowchart to describe an example of a process for predicting effect of a measure shown in FIG. 3.
Figure 10:
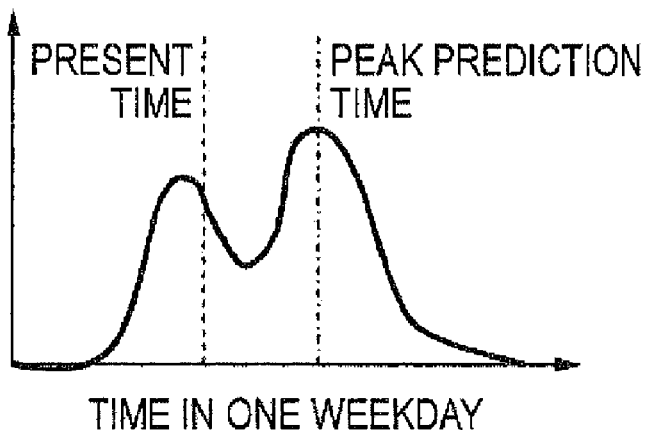
FIG. 10 is a drawing to describe the process for predicting effect of a measure shown in FIG. 9.
Figure 11:
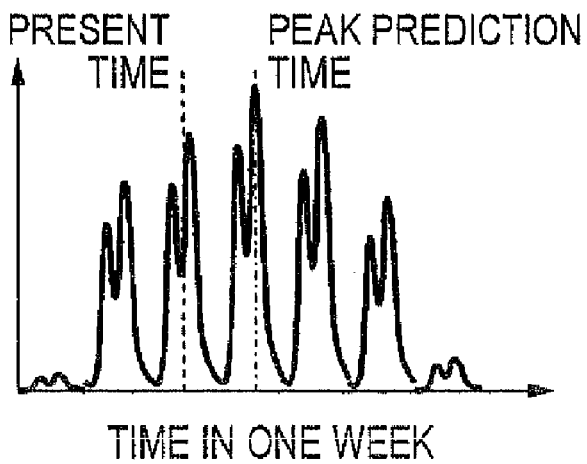
FIG. 11 is a drawing to describe the process for predicting effect of a measure shown in FIG. 9.

FIG. 9 shows an operational example of the measure effect prediction unit 13. In this example, the measure effect prediction unit 13 predicts the timings at which the effect of the measure is high (activity start or delivery time), based on the variation in the periodic group action probability.

In FIG. 9, first, the measure effect prediction unit 13 searches for a peak in the probability pattern after the current time of the day as a timing at which the effect of the measure is high, and obtains a time at which the peak in the probability pattern appears (S30). Subsequently, the measure effect prediction unit 13 searches for a peak in the probability pattern after the current day of the week as a next effective timing, and obtains a time at which the peak in the probability pattern appears (S31). The result is displayed on a screen, is sent via mail for output or is recorded (S32).

In the exemplary embodiment, the period is fixed as a day and a week. However, if there is a period found by Fourier transform, the measure effect prediction unit 13 may search for a peak within the one period.

Taking the office attendance ratio based on an action history as an example, a time period where the office attendance ratio is high is a high-effect time period. However, the effect judgment criterion varies depending on a target activity history. To suppress the load during the updating of a Web page, for example, it is more effective to update the Web page in a time period where the amount of access is small. Therefore, the measure effect prediction unit 13 may calculate the peak in the probability pattern so as to find a time period where a low value is taken. Also, the measure effect prediction unit 13 may present a stationary office attendance ratio in each time period as it is, as an effective prediction in each time period.

Several modified examples will be described below.

To begin with, a first modified example will be described.

Figure 12:
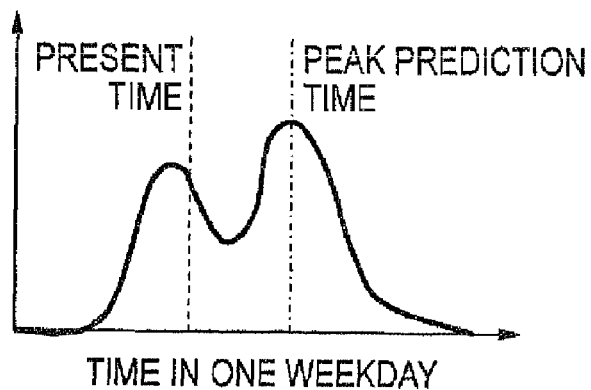
FIG. 12 is a drawing to describe a first modified example.
Figure 13:
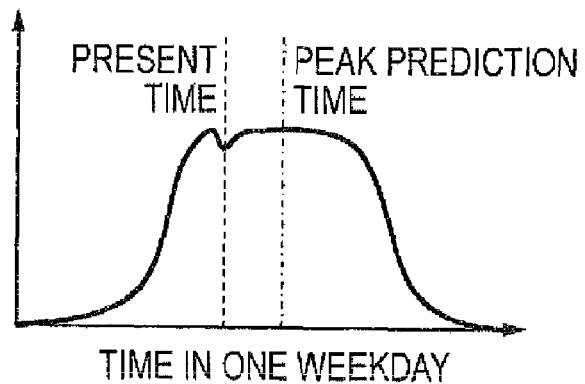
FIG. 13 is a drawing to describe the first modified example.

An activity pattern may vary from one specific group to another in such a manner that sales people visit customers during daytime hours while development staff scarcely go out of the office once they go to the office, for example. However, although one person knows a pattern of the group to which the person belongs, the person often does not know an activity pattern of a group to which the person does not belong on a different floor or at a different site. Then, an activity pattern is obtained in advance by totalizing for each preset group. FIG. 12 shows an example of an activity pattern of members of a sales department, and FIG. 13 shows an example of an activity pattern of members of a development department. For example, if one member of the development staff wants to contact plural members of the sales department, an effect of a measure is predicted using the activity pattern of the department based on address information. Accordingly, it is made possible to provide such support of promoting communications between the groups.

Next, a second modified example will be described.

Figure 14:
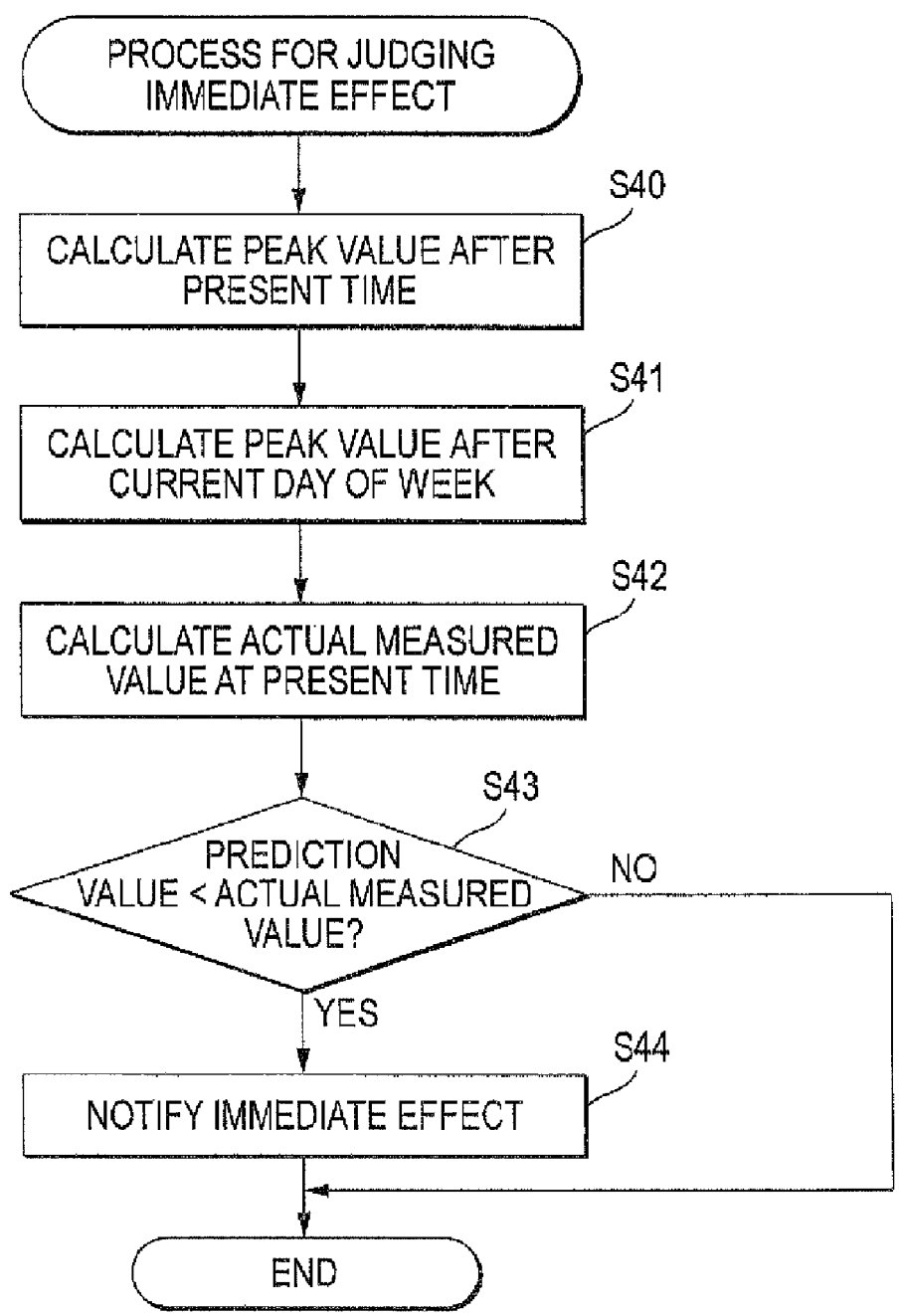
FIG. 14 is a flowchart to describe a second modified example.
Figure 15:
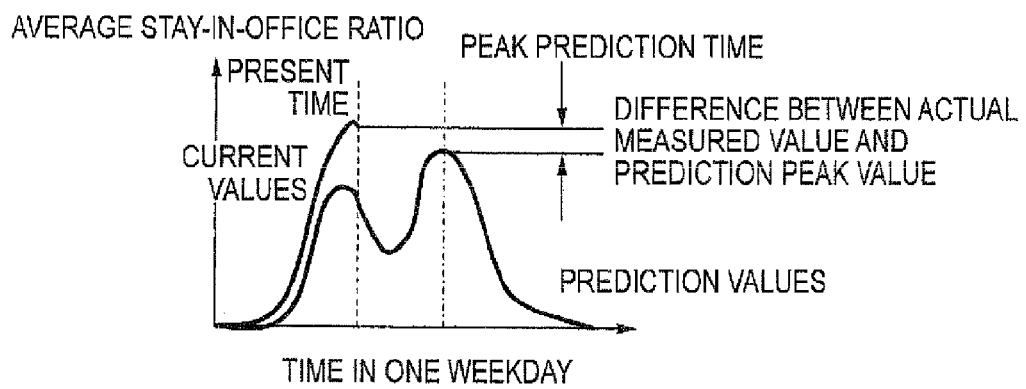
FIG. 15 is a drawing to describe the second modified example.

In the second modified example, the measure effect prediction unit 13 calculates a prediction value of a peak time, at which the probability pattern takes a peal value, in a stationary state. Thereafter, the measure effect prediction unit 13 compares the calculated prediction value of the peak time with an actual value at the present time. If the current actual value is higher than the prediction peak value, the output unit 14 notifies or displays that the effect of the measure at the present time is high. FIG. 14 shows an example of this process. In FIG. 14, the measure effect prediction unit 13 calculates a peak value in the probability pattern after the present time (S40). Next, the measure effect prediction unit 13 cal-culates a peak value in the probability pattern after the current day of week (S41). Then, the measure effect prediction unit 13 an actual measured value at the present time (S42) and judges as to whether or not each prediction value is smaller than the actual measured value (S43). If the actual measured value is larger than every prediction value as shown in FIG. 15, the output unit 14 notifies of an immediate effect to prompt immediate activity (S44). Otherwise, the output unit 14 notifies a measure from the viewpoint of any peak value as usual. Focusing attention on a difference between the actual measured value at the present time and the prediction peak value shown in FIG. 15, the measure effect prediction unit 13 may judge that an immediate effect is brought only when the difference is equal to or greater than a predetermined value, that is, only when the actual measured value is larger than the peak value by a predetermined difference or more. In so doing, it is made possible to absorb fluctuations of the actual measured value.

Next, a third modified example will be described.

In the third modified example, the activity tendency extraction unit 12 performs the process for calculating periodic probability with respect to logs different in type and the measure effect prediction unit 13 performs the process for calculating effect of a measure with respect to the difference therebetween.

Figure 16:
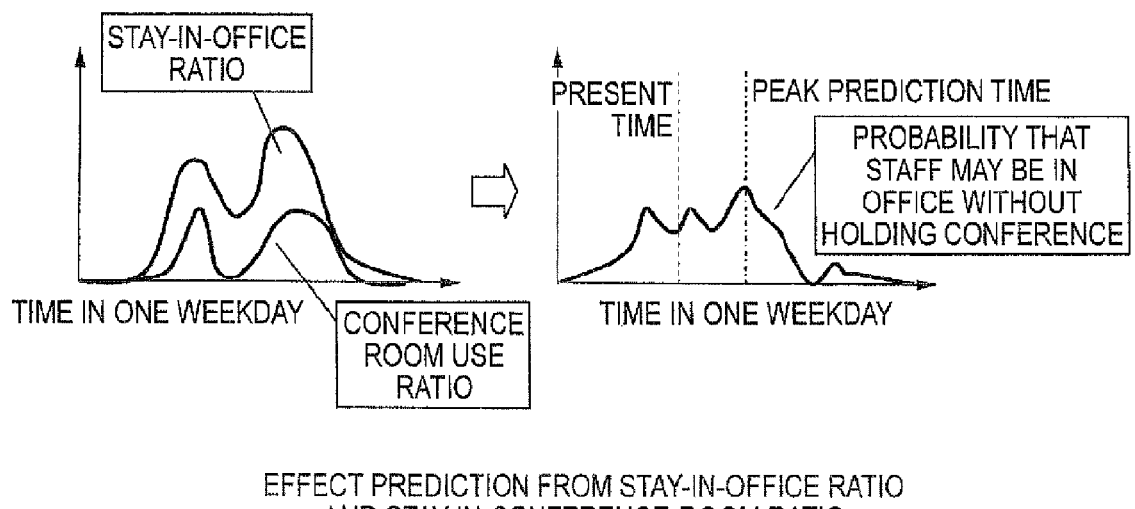
FIG. 16 is a drawing to describe a third modified example.

For example, in the case of using the office attendance ratio and a conference room attendance ratio in combination, as shown in FIG. 16, the activity tendency extraction unit 12 subtracts the conference room attendance ratio from the office attendance ratio. Thereby, the measure effect prediction unit 13 can calculate a time period where a probability that no conference may be held and staff attendance in the office is high. Accordingly, the effect of the activity measure such as broadcasting becomes more reliable.

In the case of using the office attendance ratio and an IT tool log in combination, the activity tendency extraction unit 12 calculates a difference between the office attendance ratio and a frequency obtained by shifting a transmission frequency of the mail server a predetermined time period. Thereby, the measure effect prediction unit 13 can calculate a time period where the office attendance ratio is high rather than the mail creation time. Accordingly, the effect of the activity measure such as broadcasting becomes more reliable.

As for a storage log in and an access log to the file server, a similar operation is performed, whereby the effect of the activity measure such as broadcasting becomes more reliable.

Plural logs may be combined, whereby the effect becomes more reliable.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An action efficiency support apparatus comprising:
   a detection unit that detects an activity to acquire activity information;
   a storage unit that stores the activity information;

a calculation unit that calculates a probability pattern as to presence or absence of the activity in a predetermined period or a probability pattern of a frequency of occurrence of the activity in the predetermined period, based on the activity information; and a judgment unit that judges an effect of a future action based on the calculated probability pattern, wherein the activity is access to an information processing system.

2. The action efficiency support apparatus according to claim 1, wherein the information processing system is an electronic mail system or a document file system.

3. The apparatus according to claim 1, further comprising: an output unit that outputs a peak of the effect of the action judged by the judgment unit.

4. The apparatus according to claim 1, wherein the effect of the action is represented by a probability value of the calculated probability pattern.

5. The apparatus according to claim 4, further comprising:
a unit that judges that the personal action is effective at a present time if an actual measured value corresponding to the probability value of the probability pattern is larger than a peak value of the probability pattern by a predetermined value.

6. The apparatus according to claim 1, wherein the period is at least one of one day, one week, one month and one year.

7. The apparatus according to claim 1, wherein the calculation unit obtains the period by executing Fourier transform of a statistic amount of the activity.

8. The apparatus according to claim 1, wherein the probability pattern is based on a temporal change of the activity information.

9. A method for supporting an activity to be effective, the method comprising:

detecting the activity to acquire activity information;

calculating a probability pattern as to presence or absence of the activity in a predetermined period or a probability pattern of a frequency of occurrence of the activity in the predetermined period, based on the activity information; and judging an effect of a future action based on the calculated probability pattern, wherein the activity is access to an information processing system.

10. The apparatus according to claim 9, wherein the probability pattern is based on a temporal change of the activity information.

11. A tangible computer readable medium storing a program causing a computer to execute a process for supporting an activity to be effective, the process comprising:

detecting the activity to acquire activity information;

calculating a probability pattern as to presence or absence of the activity in a predetermined period or a probability pattern of a frequency of occurrence of the activity in the predetermined period, based on the activity information; and judging an effect of a future action based on the calculated probability pattern, wherein the activity is access to an information processing system.

12. The apparatus according to claim 11, wherein the probability pattern is based on a temporal change of the activity information.

* * * * *